UNITED STATES PATENT OFFICE 2,538,100

VINYL SULFONE COPOLYMERS

Ernest P. Irany, Cranford, and Edward F. Landau, Newark, N. J., assignors to Celanese Corporation of America, a corporation of Delaware No Drawing. Application August 13, 1946, Serial No. 690,326

3 Claims. (Cl. 260—79.3)

This invention relates to thermoplastic resinous material and relates more particularly to the preparation of certain novel thermoplastic resinous materials by effecting a copolymerization of vinyl sulfones with monomeric polymerizable unsaturated compounds.

An object of this invention is to provide a novel process for the preparation of copolymers of vinyl sulfones with monomeric polymerizable unsaturated compounds.

Another object of this invention is the provision of modified thermoplastic polymers of monomeric polymerizable unsaturated compounds having increased resistance to deformation by heat.

A further object is the provision of modified thermoplastic polymeric resinous materials of improved thermal stability which are soluble in common organic solvents and which may be employed advantageously in the production of molded objects by compression, extrusion and injection molding methods, and the like.

Other objects of this invention will appear from the following detailed description.

Materials of an initially thermoplastic nature may be made highly resistant to distortion under the influence of heat by establishing in their structure a network of rigid molecular crosslinkages. In the case of certain initially thermoplastic materials, the effect of establishing such rigid cross-linkages may be carried to the point where the thermoplastic character of the material is lost and a thermosetting material is obtained. The final molded form or shape produced from said thermosetting material under the action of heat and pressure, may no longer be influenced materially by heat. The final molded product obtained is completely infusible and insoluble in organic solvents. Such infusible materials are obtained in the case of phenolic or urea resins, and vulcanized rubber. Somewhat similar thermosetting compounds are obtained by the interpolymerization of polymerizable monomeric compounds, at least one of which compounds contains two or more reactive, polymerizable structural groupings. The addition of minute amounts of polymerizable monomers containing two or more reactive groupings to ordinarily thermoplastic polymerizable monomers has a very pronounced effect on said polymerizable monomers, and on copolymerization therewith imparts to the resulting polymer substantial insolubility in organic solvents as well as resistance to molding. Such an effect is quite undesirable where permanently thermoplastic resinous compositions are desired. Scrap material produced on the molding of said modified copolymerized molding compositions cannot be satisfactorily reworked and the thermosetting character of the polymers results in an excessive waste of material.

We have now found that by copolymerizing organic sulfones of the general formula R—SO$_2$—R' wherein R is a monovalent substituent such as an aryl group, a substituted aryl group containing substituents such as a methyl, nitro, amino or halide group, or a substituted or unsubstituted saturated alkyl, cycloalkyl or aralkyl group and R' is a monovalent group containing a single olefinic carbon to carbon linkage, with an unsaturated polymerizable monomer normally yielding thermoplastic polymers, such as styrene, there are obtained resinous copolymers having substantially improved resistance to heat distortion without suffering any loss in thermoplasticity or solvent solubility. Thus, by copolymerizing moderate amounts of a suitable vinyl sulfone, for example, with styrene, the resulting molded copolymer exhibits substantially improved heat resistance as compared to the ordinary thermoplastic polymerized compounds which are formed by effecting the polymerization without the presence of an unsaturated sulfone in the reaction mixture.

As examples of unsaturated sulfones which may be employed in the production of the novel copolymers of our invention, there may be mentioned phenyl vinyl sulfone, cresyl vinyl sulfone, benzyl vinyl sulfone, naphthyl vinyl sulfone, n-propyl vinyl sulfone, methyl vinyl sulfone, chlorphenyl vinyl sulfone, and cyclohexyl vinyl sulfone.

The proportion of unsaturated sulfone in the copolymers formed in accordance with our novel process may vary depending upon the degree of heat resistance desired in the final copolymer. The greater the proportion of unsaturated sulfone present the greater will be the increase in heat resistance of the thermoplastic polymerized monomer with which copolymerization is effected. Thus, the copolymer may ordinarily contain up to about 40% by weight, or more, of the unsaturated sulfone.

The copolymerization may be carried out in any convenient manner and may be effected in bulk, in solution or in an emulsion of the copolymerizing compounds. Advantageously, a suitable polymerization catalyst is added to the mixture of copolymerizing compounds to aid the polymerization reaction. Such polymerization catalysts are well known in the art, and are, for example, organic and inorganic peroxides, persulfates, perborates, etc. such as benzoyl peroxide, hydrogen peroxide, etc. The proportion of catalyst employed is generally from about 0.1 to 5% on the weight of the combined reactants. When our novel copolymerized resins are prepared in bulk, for example, the polymerization may be effected at temperatures of from 50 to 150° C., the desired degree of polymerization being obtained in from about 1 to 100 hours. When copolymerization is effected in emulsion form employing emulsifying agents such as, soap, the dioctyl ester of sodium sulfosuccinic acid or the polyoxyalkylene ether of a partial ester of a long chain aliphatic acid such as palmitic acid, stearic acid or oleic acid, maintaining the reactants at temperatures of from 40 to 95° C. for 1 to 50 hours is sufficient to effect the copolymerization. When a solution method of copolymerization is employed solvents such as benzene, acetone, or ethyl acetate are satisfactory with temperatures of the order of 50 to 100° C. being employed to effect copolymerization in 5 to 200 hours.

In order further to illustrate our invention, but without being limited thereto, the following examples are given:

Example I

Phenyl vinyl sulfone and monomeric styrene are mixed together in the proportions set out in the following table and 0.25% on the weight of the mixture of benzoyl peroxide is added thereto. Each of the resulting mixtures is heated in an atmosphere of nitrogen for 20 hours at 65° C. and then for 72 hours at 100° C. A clear, hard, colorless homogeneous resin is obtained in all cases. The resins are dissolved in benzene and reprecipitated therefrom by pouring the solution into methanol. The products are white powders which contain sulfur in approximately the same percentage as is present in the initial unpolymerized mixture. These powders may be molded to hard clear bodies having softening temperatures which are higher than the softening temperature of molded polystyrene by the amounts indicated in the table.

| Phenyl Vinyl Sulfone, per cent by wt. | Styrene, per cent by wt. | Yield of Precipitated Polymer, per cent | Sulfur in Interpolymer, per cent by analysis | Increase in softening temperature over Polystyrene, °C. |
|---|---|---|---|---|
| 0.0 | 100 | 96 | 0.0 | 0 |
| 1 | 99 | 95 | 0.29 | 3 |
| 2 | 98 | 94 | 0.39 | 5 |
| 5 | 95 | 92 | 0.98 | 6 |
| 10 | 90 | 90 | 1.8 | 12 |
| 21 | 79 | 87 | 3.9 | 18 |
| 30 | 70 | 93 | 5.5 | 33 |
| 40 | 60 | 65 | 6.9 | 37 |

The heat distortion or softening test employed to determine the increase in softening temperature obtained by effecting the copolymerization is performed in the following manner:

A sample having the dimensions of about 3″ x 1½″ and about 0.020 inch in thickness is prepared by compression molding. This molded piece is held at one end, immersed to about two thirds of its length in a liquid e. g., glycerine, which is neither a solvent for, nor absorbed by the sample material and moved back and forth about four inches through said liquid. The sample is subjected to this test at various temperatures to which the liquid is heated. The temperature at which the sample shows a sharp and easily observable transition from a rigid to a limp condition 5 to 10 seconds after immersion is taken as the heat distortion temperature as used in the above table. The actual value obtained by the above test for pure polystyrene, as prepared in the manner described above for the preparation of the copolymer, is 118 to 120° C.

Example II

Benzyl vinyl sulfone and monomeric styrene are mixed in the proportions indicated below together with 0.25% by weight of benzoyl peroxide and then heated under a nitrogen atmosphere for five days at 80° C. The products obtained are clear hard resins which are then dissolved in benzene and reprecipitated therefrom by pouring the solution into methanol. The products are white powders containing sulfur in approximately the same proportion as in the initial unpolymerized mixture. These materials may be molded to hard clear bodies which have softening temperatures higher than the polystyrene sample by the amounts shown in the table.

| Benzyl Vinyl Sulfone, per cent by wt. | Styrene, per cent by wt. | Yield of Precipitated Polymer, per cent | Sulfur in Interpolymer, per cent by analysis | Increase in softening temperature over Polystyrene, °C. |
|---|---|---|---|---|
| 0.0 | 100 | 96 | 0.0 | 0 |
| 1 | 99 | 95 | 0.23 | 1 |
| 2 | 98 | 94 | 0.35 | 2 |
| 5 | 95 | 93 | 0.83 | 4 |
| 10 | 90 | 90 | 1.6 | 7 |
| 20 | 80 | 81 | 2.7 | 10 |
| 30 | 70 | 60 | 3.6 | 17 |

Example III

Naphthyl vinyl sulfone and styrene are mixed in the proportions indicated below together with 0.25% of benzoyl peroxide and the mixtures are each heated at 80° C. for five days under a nitrogen atmosphere. The copolymers obtained are clear, hard moldable materials and are then treated and precipitated as described in Example II to form moldable powders. Molded objects obtained by molding said resin powders have softening temperatures higher than polystyrene by the amount indicated in the table below.

| Naphtyl Vinyl Sulfone, per cent by wt. | Styrene, per cent by wt. | Yield of Precipitated Polymer, per cent | Sulfur in Interpolymer, per cent by analysis | Increase in softening temperature over Polystyrene, °C. |
|---|---|---|---|---|
| 0.0 | 100 | 94 | 0.0 | 0 |
| 2.5 | 97.5 | 93 | 0.32 | 2 |
| 5 | 95 | 93 | 0.66 | 6 |
| 10 | 90 | 86 | 1.61 | 15 |

Example IV

Styrene is mixed with n-propyl vinyl sulfone in the proportions indicated in the table below together with 0.25% of benzoyl peroxide and the mixtures copolymerized and treated in the manner described in Example II. The polymers obtained are clear, hard moldable bodies resembling polystyrene but having higher softening temperatures as indicated in the table.

| n-Propyl Vinyl Sulfone, per cent by wt. | Styrene, per cent by wt. | Yield of Precipitated Polymer, per cent | Sulfur in Interpolymer, per cent by analysis | Increase in softening temperature over Polystyrene, °C. |
|---|---|---|---|---|
| 0.0 | 100 | 95 | 0.0 | 0 |
| 5 | 95 | 94 | 1.1 | 3 |
| 11 | 89 | 94 | 3.7 | 12 |

Example V

A solution of 2 parts of phenyl vinyl sulfone in 18 parts of styrene, is added to an aqueous mixture of 24 parts of a 1.25% solution of sodium dioctyl sulfosuccinate, 1.2 parts of water and 2.8 parts of a 5% hydrogen peroxide solution. This mixture is placed in a bottle and sealed under a nitrogen atmosphere, and the contents are shaken until an emulsion is formed. The emulsion is heated at 60° C., while being agitated. At the end of 64 hours the emulsion is poured into 500 parts of methanol and precipitated. The white powder which separated on precipitation is filtered off, washed with methanol and dried. The 18 parts of material so obtained contain 1.8% sulfur (theoretical amount) and may be molded into clear, hard, useful articles having a softening temperature 10° C. higher than polystyrene.

Example VI

A material similar to the product obtained in Example V may be prepared by using 2 parts of benzyl vinyl sulfone instead of phenyl vinyl sulfone but otherwise conducting the copolymerization and after-treatment as described in Example V. The product has a softening temperature 8° C. higher than polystyrene.

Example VII

The use of 2 parts of naphthyl vinyl sulfone instead of phenyl vinyl sulfone in the copolymerization process described in Example V results in a product having a softening temperature 10° C. higher than polystyrene.

It is to be understood that the foregoing detailed description is given merely by way of illustration and that many variations may be made therein without departing from the spirit of our invention.

Having described our invention, what we desire to secure by Letters Patent is:

1. Process for the production of thermoplastic copolymers having a softening temperature higher than polystyrene which comprises catalytically copolymerizing a mixture consisting of monomeric styrene and from 10 to 40% by weight of a sulfone selected from the group consisting of phenyl vinyl sulfone, n-propyl sulfone and benzyl vinyl sulfone, the said catalytic copolymerization reaction being effected with the aid of a peroxide polymerization catalyst selected from the group consisting of benzoyl peroxide and hydrogen peroxide.

2. Process for the production of thermoplastic copolymers having a softening temperature higher than polystyrene, which comprises catalytically copolymerizing a mixture consisting of monomeric styrene and from 10 to 40% by weight of phenyl vinyl sulfone, in admixture with 0.25% of benzoyl peroxide on the weight of the mixture as polymerization catalyst, by heating the mixture in an atmosphere of nitrogen for about 20 hours at 65° C. and then for about 100 hours at 100° C.

3. Process for the production of thermoplastic copolymers having a softening temperature higher than polystyrene, which comprises emulsifying, under nitrogen, a mixture consisting of 2 parts by weight of phenyl vinyl sulfone, 18 parts by weight of styrene, 24 parts by weight of a 1.25% aqueous solution of sodium dioctyl sulfosuccinate, 1.2 parts of water and 2.8 parts of a 5% aqueous hydrogen peroxide solution, and heating the emulsion for 64 hours at 60° C., and precipitating the copolymer formed by pouring the reaction mixture into methanol.

ERNEST P. IRANY.
EDWARD F. LANDAU.

REFERENCES CITED

The following references are of record in the file of this patent:

UNITED STATES PATENTS

| Number | Name | Date |
|---|---|---|
| 2,163,180 | Ufer | June 20, 1939 |
| 2,395,327 | Hanford | Feb. 19, 1946 |
| 2,472,672 | Mighton | June 7, 1949 |

FOREIGN PATENTS

| Number | Country | Date |
|---|---|---|
| 662,156 | Germany | July 7, 1938 |